United States Patent Office 3,545,991
Patented Dec. 8, 1970

3,545,991
TACK COMPOSITION FOR ELASTOMERIC POLYMERS
Ralph W. Body, Wilmington, Del., assignor to Hercules Incorporated, Wilmington, Del., a corporation of Delaware
No Drawing. Filed May 1, 1967, Ser. No. 634,847
Int. Cl. C08h *11/04*
U.S. Cl. 106—239
10 Claims

ABSTRACT OF THE DISCLOSURE

A composition of matter comprised of (A) a stabilized rosin such as hydrogenated rosin, (B) rosin amine, and (C) an oil such as a naphthenic oil is used to provide a tacky surface on elastomeric polymers such as EPR and EPDM. The tacky surface provides adequate building tack for the manufacture of automobile tires and the like.

---

This invention relates to the synthetic rubber art.

Particularly, this invention relates to a novel composition of matter adapted particularly for application, preferably in the form of a solution thereof in a solvent, to the surface of rubbery copolymers of ethylene and another copolymerizable monomer selected from $\alpha$-monoolefins such as propylene (rubbery copolymers of ethylene and propylene being sometimes referred to in the art as "EPR") and to the surface of vulcanizable unsaturated rubber-like interpolymers of ethylene, at least one other copolymerizable monomer selected from $\alpha$-monoolefins, and at least one nonconjugated hydrocarbon diene, to provide thereon, after solvent removal, a tacky surface.

In the preparation of articles from synthetic rubber, it is often necessary to assemble articles from smaller pieces. For example, a tire is usually constructed or built by applying layers of rubber-coated fabric one to another, followed by a breaker strip, cushion, and tread. The layers must possess sufficient surface tack to adhere firmly one to another and to maintain the desired relative position of the various parts prior to vulcanization. Absence of tack in many cases causes difficulty in the building operation. Thus, tack is an important property in the tire-building field for here it is necessary to put the various parts of the tire together in a matter of minutes such as, for example, about 2 minutes to 5 minutes, in order that the operation be economically feasible. Since tires generally comprise from 2 to 10 plies, it is apparent that the surface of the plies must adhere readily one to another in order to permit rapid building and yet produce a tire that will not prove faulty in use. Tack is also important in all applications requiring the "laying-up" of piles such, for example, as in hose manufacture and in belt manufacture.

Recently, there has been introduced to the tire manufacturer a sulfur vulcanizable unsaturated rubberlike (elastomeric) interpolymer of (1) ethylene, (2) at least one $\alpha$-olefin, such as propylene, having the structure $R$—$CH$=$CH_2$ where R is a $C_1$–$C_8$ alkyl radical, and (3) a nonconjugated hydrocarbon diene such, for example, as 1,4-hexadiene and dicyclopentadiene. To date, the most interesting commercially of the elastomeric polymers are those derived from ethylene, propylene, and a nonconjugated hydrocarbon diene. An elastomeric interpolymer of this type is referred to in the art as an unsaturated, vulcanizable, rubbery terpolymer of ethylene, propylene, and a copolymerizable diene; ethylene-propylene terpolymer (EPT); and ethylene-propylene-diene methylene (EPDM).

These elastomeric interpolymers do not have sufficient tack to be used economically in the manufacture of tires for automobiles, and the like. This is a fact well known in the art and many attempts have been made to solve this problem. The difficulty, industry-wide, is to develop tack without impairing the vulcanization rates and without impairing the properties of vulcanizates such as modulus, elongation, heat build-up, and the like.

In accordance with this invention there is provided a novel composition of matter adapted for application to the surface of an elastomeric polymer member that lacks surface tack, such as EPR and EPDM, to provide said member with a tacky surface.

The novel composition of this invention is comprised of (A) a substantially stable modified rosin such as hydrogenated rosin and disproportionated rosin; (B) rosin amine; and (C) an extender oil for rubber selected from the group consisting of naphthenic oil, aromatic oil, highly aromatic oil and mixtures thereof. The range of proportions of the components (A), (B) and (C) can be varied to a substantial degree; however, the preferred range for the purpose of this invention is, by weight, from about 5 parts to 10 parts of rosin component (A), from about 1 part to 5 parts of rosin amine component (B), and from about 1 part to 10 parts of oil component (C).

Application of the above composition to a surface of an elastomeric polymer member, such as EPR and EPDM, is made preferably from solution. Suitable solvents for the composition will be a solvent or a mixture of solvents that will dissolve substantially all three components of the composition, is inert to the components of the composition and is also inert to the elastomeric polymer member to which the solution is applied. Suitable solutions will be comprised of, by weight, from about 5% to about 50% of solids, and preferably from about 10% to about 20% solids. Too low a solids content requires two or more applications and too high a solids concentration is difficult to apply conveniently.

Suitable solvents for use herein include aromatic hydrocarbons such as benzene, toluene, and the like; ketones such as acetone, methyl ethyl ketone, methyl isobutyl ketone, and the like; aliphatic hydrocarbons such as hexane, heptane, octane, gasoline, and the like; and chlorinated hydrocarbons such as methylene chloride, chloroform, carbon tetrachloride, and the like. Mixtures of two or more solvents can be used if desired.

Rosin component (A) is a rosin, such as wood rosin, gum rosin, or tall oil rosin, that has been modified by means of hydrogenation, by means of the disproportionation reaction, or the like, whereby the rosin is effectively modified to render it substantially less susceptible to air oxidation. Rosin, as used herein, means natural rosin, refined or unrefined, such as natural wood rosin, natural gum rosin, and tall oil rosin; the pure rosin acids of which rosin is comprised such as abietic acid and d-pimaric acid, alone or in admixture with one another; and mixtures of any two or more of the above.

Hydrogenated rosin, which can be used as rosin component (A), is well known in the art and is derived by hydrogenating rosin as such which consists mainly of abietic acid, pimaric acid, and the like rosin acids under conditions suitable to achieve saturation of at least about 50% of the available two double bonds of the rosin acid radicals present. The term "hydrogenated rosin" includes similarly hydrogenated products derived from any of the groups of rosin acids in substantially pure form or mixtures of the pure rosin acids. Hydrogenated rosin can be prepared, for example, by contacting fluid, refined rosin with hydrogen in the presence of an activated nickel catalyst under a pressure of about 4000 to 5000 pounds per square inch and at a temperature of about 210° C. to about 230° C. Suitable methods for producing hydrogenated rosin are described in Pat. 2,094,117, reference to which is hereby made.

Disproportionated rosin, which can be used as component (A), can be prepared from any suitable rosin material including gum rosin, wood rosin, and tall oil rosin and in any suitable manner as by heat treatment in the presence of a catalyst such as iodine, sulfur dioxide, platinum and the like known catalyst. Suitable methods for effecting disproportionation of rosin are disclosed in Pat. 2,138,183, reference to which is hereby made. Commercially available disproportionated rosins will contain usually, by weight, about 0.5% abietic acid, from about 40% to 60% dehydroabietic acid, and the remainder mostly dihydro rosin acids and a small amount of neutral materials. Mixtures of disproportionated rosin and hydrogenated rosin can be used if desired.

The monomeric rosin acid distillate obtained as a by-product of rosin polymerization is a stabilized rosin that can be used as rosin component (A). It has good resistance to air oxidation and has good stability to heat and light. This monomeric rosin acid distillate will usually contain, by weight, about 89% resin acids, and about 11% neutral material. Of the resin acids about 76% are the stabilized type such as dehydroabietic acid, dihydroabietic acid, and tetrahydroabietic acid.

Rosin amine component (B) is an unsubstituted rosin amine and can be prepared from wood rosin, gum rosin, tall oil rosin and mixtures thereof by the method disclosed and described in Pat. 2,491,913, reference to which is hereby made. Briefly, the rosin acid component of rosin is first converted to a corresponding nitrile. Reaction is carried out by passing gaseous ammonia into fused rosin and vaporizing water as fast as it is formed to remove water from the reaction mass. Subsequently, the nitriles are preferably purified by neutralization and distillation. The nitriles are then subjected to hydrogenation to produce the corresponding amine. Any active hydrogenation catalyst such, for example, as nickel cobalt, Raney nickel, Raney cobalt and the like can be used in the hydrogenation reaction.

A suitable rosin amine that can be used in this invention is comprised of by weight about 70% dehydroabietylamine and about 30% dihydroabietylamine and tetrahydroabietylamine. Dehydroabietylamine can be represented by the structural formula

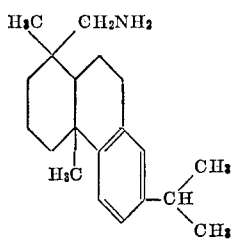

The oil component (C) can be any of those oils that have been used heretofore in the rubber art as extending oils. A wide range of oils having various chemical and physical properties are thus included. Any of the well-known oils that are compatible with rubber, ranging from very light to very viscous, can be used as component (C). Suitable oils include those known in the rubber art as naphthenic oils, aromatic oils, and highly aromatic oils. Mixtures of two or more can be used if desired. Preferred oils are of the naphthenic type.

A particularly suitable naphthenic oil for use in this invention is that available commercially under the proprietary designation Circosol 2XH which is a light lubricating oil fully described in Rubber Age, vol. 70, No. 6, pages 735–747, March 1953, and a product of Sun Oil Company. This oil contains naphthenic hydrocarbons of high molecular weight in the form of a heavy, viscous, transparent, pale green, odorless liquid of low volatility; it has a specific gravity at 25° C. of 0.940 and a viscosity of about 2000 SUS at 100° F.

Another suitable naphthenic oil is that available under the proprietary designation Circosol 2X which is a naphthenic-type hydrocarbon oil containing some aromatic oil. It is a light green viscous hydrocarbon liquid having a specific gravity of 0.94, a viscosity of 200 SUS at 100° F. and a viscosity of 85 SUS at 210° F.

The sulfur-vulcanizable elastomeric interpolymers to which this invention is applicable are derived by copolymerizing ethylene; an α-monoolefin having the structure R—CH=CH$_2$, wherein R is an alkyl radical of not more than 8 carbon atoms; and a nonconjugated hydrocarbon diene, by known methods.

Examples of useful α-monoolefins having the structure R—CH=CH$_2$, as above defined, include propylene; 1-butene; 1-heptene; 1-decene; 1-pentene; 5-methyl-1-hexene; 4-methyl-1-pentene; 1-octene; 5,5-dimethyl-1-octene; 4-methyl-1-hexene; 4,4-dimethyl-1-pentene; 1-hexene; 1-nonene; 5-methyl-1-nonene; 5-methyl-1-heptene; 6-methyl-1-heptene; 4,4-dimethyl-1-hexene; and 5,6,6-trimethyl-1-heptene.

Examples of dienes include dicyclopentadiene; tricyclopentadiene; tetracyclopentadiene; 5 - alkenyl - substituted 2 - norbornene; 5 - methylene - 2-norbornene; and 2-alkyl-2,5-norbornadienes.

Another suitable diene is an aliphatic diene having the structure (I) 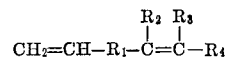

wherein R$_1$ is an alkylene radical; R$_2$ and R$_3$ are selected independently from the group consisting of hydrogen and alkyl radicals; and R$_4$ is an alkyl radical; and wherein R$_1$ through R$_4$ are so selected that the aliphatic diene has from about 6–22 carbon atoms. Specific examples of aliphatic dienes having the above structure (I) include 1,4-hexadiene; 1,9 - octadecadiene; 6 - methyl - 1,5-heptadiene; 7 - methyl - 1,6 - octadiene; 11-ethyl-1,11-tridecadiene; 9 - ethyl - 1,9 - undecadiene; 7 ethyl-1,7 - nonadiene; 8-propyl - 1,8 - undecadiene; 8 - ethyl-1,8-decadiene; 10-ethyl - 1,9 - dodecadiene; 12 - ethyl-1,12-tetradecadiene; 13 - n - butyl - 1,12-heptadecadiene; and 15-ethyl-1,15-heptadecadiene. Dienes such as 11 - ethyl - 1,11 - tridecadiene are made by reacting an alkyl Grignard reagent with the alkyl ester of an omega-unsaturated carboxylic acid and dehydrating the tertiary alcohol thereby produced.

Examples of interpolymers of ethylene, at least one α-monoolefin, and at least one of the above aliphatic dienes include ethylene/propylene/1,4 - hexadiene; ethylene/1 - butene/1,4 - hexadiene, ethylene/1 - butene/1,4-hexadiene/11 - ethyl - 1,11 - tridecadiene; ethylene/1-butene/1 - octene/6 - methyl - 1,5-heptadiene; and ethylene/1-pentene/1,4, hexadiene/1,9-octadecadiene.

Examples of interpolymers of ethylene, at least one α-monoolefin as above defined, and dicyclopentadiene include ethylene/propylene/dicyclopentadiene;
ethylene/1-butene/dicyclopentadiene;
ethylene/propylene/1-butene/dicyclopentadiene;
ethylene/1-octene/dicyclopentadiene;
ethylene/propylene/1-hexene/dicyclopentadiene;
ethylene/1-heptene/1-decene/dicyclopentadiene; and
ethylene/5-methyl-1-heptene/dicyclopentadiene.

The diene employed to prepare the polymers used in this invention can be 5 - alkylidene - 2 - norbornene, such as 5 - methylene - 2 - norbornene and 5-ethylidene-2-norbornene. 5 - methylene - 2 - norbornene can be prepared by the method disclosed and described in Pat. 3,162,-

620, reference to which is hereby made. 5-methylene-2-norbornene can be represented by the structure (II)

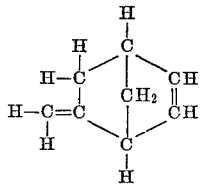

Examples of interpolymers of ethylene, at least one α-monoolefin as defined above, and 5-methylene-2-norbornene include ethylene/propylene/5-methylene-2-norbornene;
ethylene/1-butene/5-methylene-2-norbornene;
ethylene/1-decene/5-methylene-2-norbornene;
ethylene/5,5-dimethyl-1-octene/5-methylene-2-norbornene;
ethylene/4-methyl-1-hexene/5-methylene-2-norbornene;
ethylene/4,4-dimethyl-1-pentene/5-methylene-2-norbornene; and
ethylene/5,6,6-trimethyl-1-heptene/5-methylene-2-norbornene The 5-alkenyl-2-norbornenes that can be employed in preparing the interpolymers used in this invention can be represented by the structure (III)

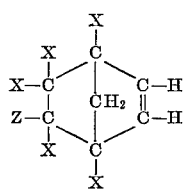

wherein each X represents hydrogen or a monovalent alkyl radical of from 1 to 6 carbon atoms and Z represents a monovalent alkenyl radical, the carbon-to-carbon double bond therein being internal. Specific examples of 5 - alkenyl - 2 - norbornenes include 5-(2'-butenyl)-2-norbornene derived from cyclopentadiene and 1,4-hexadiene; 5 - (1' - propenyl) - 2 - norbornene derived from cyclopentadiene and 1,3-pentadiene;

5-(2'-ethyl-2'-butenyl)-2-norbornene;
5-(2'-ethyl-1'-butenyl)-2-norbornene;
5-(2'-methyl-1'-propenyl)-2-norbornene;
5-(2'-propyl-2'-pentenyl)-2-norbornene;
5-(2'hexyl-2'-undecenyl)-2-norbornene;
5-(2'-nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene;
5-(2'-octyl-2'-butenyl)-2-norbornene
5-(2'-ethyl-2'-decenyl)-2-norbornene; and
5-(2'-ethyl-1'-octenyl)-2-norborne.

Examples of interpolymers of ethylene, at least one α-monoolefin, and a 5-alkenyl-2-norbornene include ethylene/propylene/5-(2'-butenyl)-2-norbornene;
ethylene/propylene/5-(2'-ethyl-2'-butenyl)-2-norbornene;
ethylene/propylene/5-(2'-ethyl-1'-butenyl)-2-norbornene;
ethylene/propylene/5-(1'-propenyl)-2-norbornene;
ethylene/1-butene/5-(2'-heptyl-1'-undecenyl)-2-norbornene;
ethylene/1-butene/5-(2'-butenyl)-2-norbornene;
ethylene/1-butene/5-(2'-ethyl-2'-butenyl)-2-norbornene;
ethylene/4,4-dimethyl-1-hexene/5-(2'-propyl-2'-pentenyl)-2-norbornene;
ethylene/5,5-dimethyl-1-octene/5-(2'-nonyl-2'-heptenyl)-2-norbornene;
ethylene/6-methyl-1-heptene/5-(2'-methyl-2'-decenyl)-2-norbornene;
ethylene/1-decene/5-(2'-hexyl-2'-butenyl)-2-norbornene; and
ethylene/5,6,6-trimethyl-1-heptene/5-(2'-octyl-2'-butenyl)-2-norbornene.

2-alkyl-2,5-norbornadienes can be employed as the diene component and can be represented by the structure (IV)

where R is a $C_1$–$C_6$ alkyl radical. These dienes are made by heating acetylenes having the formula R—C≡C—H, where R is a $C_1$–$C_8$ alkyl radical, with cyclopentadiene at 175° C. to 225° C. in the absence of a polymerization initiator. Closed reaction vessels made from stainless steel or glass-lined steel are satisfactory.

Interpolymers of ethylene, at least one α-monoolefin, as above described, and a 2-alkyl-substituted 2,5-norbornadiene include ethylene/propylene/2-methyl-2,5-norbornadiene;
ethylene/propylene/2-ethyl-2,5-norbornadiene;
ethylene/1-butene/2-methyl-2,5-norbornadiene;
ethylene/1-hexene/2-ethyl-2,5-norbornadiene;
ethylene/1-decene/2-butyl-2,5-norbornadiene; and
ethylene/1-heptene/2-octyl-2,5-norbornadiene.

Sulfur-vulcanizable elastomeric interpolymers of ethylene, propylene, and 1,4-hexadiene containing from about 1–15 mole percent of 1,4-hexadiene and not over 75 weight percent of ethylene, having an iodine number of from 3–50 and an intrinsic viscosity in benzene at 25° C. from about 0.5–5.0, are particularly suitable for use in the manufacture of automobile tires, and the like. The interpolymer and related interpolymers, and their method of manufacture, are disclosed and described in Pat. 2,933,480, reference to which is hereby made.

Sulfur-vulcanizable elastomeric interpolymers that also have particular utility in the manufacture of tires and the like are the interpolymers consisting of ethylene, propylene, and dicyclopentadiene having at least about 20% to about 74.5% of ethylene units and at least 25–79.5% of propylene units by weight and about 0.5–10% of dicyclopentadiene units by weight in the interpolymer. Interpolymers of this type and related interpolymers as well as their method of preparation are disclosed and described in Pat. 3,000,866, reference to which is hereby made.

Interpolymers derived from 5-alkenyl-2-norbornenes and their method of preparation are disclosed and described in Pat. 3,093,620, reference to which is hereby made. These interpolymers can be defined as sulfur-vulcanizable elastomeric interpolymers of ethylene, at least one α-olefin having the structure R—CH=CH$_2$ wherein R is a $C_1$–$C_8$ alkyl radical, and 5-alkenyl-2-norbornene, the said alkenyl radical having from 3–18 carbon atoms, the carbon-to-carbon double bond of the alkenyl radical being internal. The interpolymers have an iodine number between about 5 and 60 and contain at least about 20% ethylene units by weight, at least 25% of α-olefin units by weight, and at least about 0.03 gram-mole per 100 grams of said copolymer and not over about 20% by weight of said interpolymer of 5-alkenyl-2-norbornene.

Interpolymers derived from 5-methylene-2-norbornene and their method of preparation are disclosed and described in Pat. 3,093,621, reference to which is hereby made. These interpolymers can be defined as sulfur-vulcanizable elastomeric interpolymers of ethylene, at least one α-olefin having the structure R—CH=CH$_2$ wherein R is a C$_1$–C$_8$ alkyl radical, such, for example, as propylene, and 5-methylene-2-norbornene. The interpolymers contain at least about 20% of ethylene units by weight, at least 25% of α-olefin units by weight, and at least about 0.03 gram-mole per 100 grams of the interpolymer and not over about 20% of the interpolymer of 5-methylene-2-norbornene.

Interpolymers derived from 2-alkyl-norbornadiene and their method of manufacture are disclosed and described in Canadian Pat. 699,044 of Dec. 1, 1964, reference to which is hereby made. These interpolymers can be defined as sulfur-vulcanizable elastomeric interpolymers of ethylene, at least one α-monoolefin having the structure R—CH=CH$_2$ wherein R is an alkyl radical of from 1–8 carbon atoms and at least one 2-alkyl-norbornadiene having from about 8 to 24 carbon atoms. The interpolymers have an iodine number between 5 and 60 and contain from about 20–72.5% by weight of ethylene units, 25–77.5% by weight of α-monoolefin units, and not more than about 25% of norbornadiene units.

Methods of preparing some of the above interpolymers and related terpolymers are also disclosed and described in Pats. 3,162,620 and 3,211,709, reference to which is hereby made.

Interpolymers derived by using methyl tetrahydroindene as at least one of the nonconjugated dienes are suitable for the purposes of this invention. Such interpolymers and their method of preparation are disclosed and described in Belgian Pat. 637,939, reference to which is hereby made. Methyl tetrahydroindene can be represented by the structural formula (V)

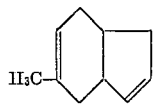

The following examples are illustrative of this invention. All parts and percentages are by weight unless otherwise specified.

EXAMPLE 1

The EPDM used in this example is a rubber terpolymer containing on a weight basis about 40% ethylene, about 55% propylene, and about 5% 1,4-hexadiene, and on a rubber basis, about 52% ethylene, about 46% propylene, and about 2% 1,4-hexadiene and has a Mooney of about 70 ML–4–212° F. The following components are thoroughly milled and subsequently sheeted by conventional means.

| Component: | Parts |
|---|---|
| EPDM as above described | 100 |
| HAF Black (carbon black) | 50 |
| Zinc oxide | 5 |
| Tetramethylthiuram monosulfide | 1.5 |
| 2-mercaptobenzthiazole | 0.75 |
| Sulfur | 1.5 |

EXAMPLE 2

Hydrogenated rosin, 5 parts, rosin amine, 5 parts, and naphthenic oil (Circosol 2XH), 1 part, are dissolved in 100 parts of toluene to provide a solution which is subsequently applied to a sheet of elastomeric material prepared in accordance with Example 1. The toluene solvent is subsequently removed by evaporation at room temperature. The surface of the elastomeric sheets becomes tacky after about ½ hour and remains tacky for about 3 days. The tacky surface thus provided permits of tire building in a time substantially shorter than the 20 to 30 minutes required heretofore. The applied composition has no adverse effects on cure properties.

Examples of other compositions of this invention are set forth in Table I. All compositions, when tested in accordance with Example 2, provide a surface coated elastomeric terpolymer sheet having good tire building tack.

TABLE I

| Example No.: | Hydrogenated rosin, parts | Disproportionated rosin, parts | Rosin amine, parts | Oil (Circosol 2XH), parts | Solvent | Parts |
|---|---|---|---|---|---|---|
| 3 | 5 |  | 5 | 1 | Toluene | 100 |
| 4 | 5 |  | 5 | 2 | do | 100 |
| 5 | 5 |  | 5 | 4 | do | 100 |
| 6 | 8 |  | 2 | 2 | do | 100 |
| 7 | 8 |  | 2 | 4 | do | 100 |
| 8 | 8 |  | 2 | 6 | do | 100 |
| 9 | 8 |  | 2 | 8 | do | 100 |
| 10 | 8 |  | 2 | 4 | Hexane | 100 |
| 11 | 8 |  | 2 | 4 | Petroleum ether | 100 |
| 12 | 8 |  | 2 | 4 | Methylene chloride | 100 |
| 13 | 8 |  | 2 | 4 | Acetone | 100 |
| 14 |  | 8 | 2 | 4 | Toluene | 100 |
| 15 | 5.5 |  | 1.5 | 3 | do | 100 |
| 16 | 6 |  | 1 | 3 | do | 100 |

Another tackifier composition for use as a surface cement or tackifier for EPR, EPDM, and like elastomeric materials consists of a stabilized rosin such as disproportionated rosin and triethanolamine in a solvent such as those hereinabove described.

As above set forth, the novel compositions of this invention can be used to provide surface tack for rubbery or elastomeric copolymers of ethylene and another copolymerizable monomer selected from α-monoolefins. An elastomeric copolymer of ethylene and propylene, referred to as EPR, is an example of the above copolymers. Specific examples of suitable copolymers of ethylene and propylene are those that have a propylene content of from about 25 mole percent to 60 mole percent and which have a reduced specific viscosity within the range of about 2 to about 8. See British Pat. 857,183 for a description of such elastomeric copolymers.

Known extending oils for rubber can be incorporated into the elastomeric compositions of this invention. The extending oils which can be used cover a wide range of oils having various chemical and physical properties. Any of the well-known oils that are compatible with rubber, ranging from very light to very viscous, can be used as extending oils in accordance with well-known practices. Whitby (Synthetic Rubber, p. 219, John Wiley & Sons, 1954) indicates that extender oils can be divided into three broad classes, namely, naphthenic, aromatic, and highly aromatic. For nondiscoloring rubbers, naphthenic oils are usually employed, while aromatic and highly aromatic oils are preferred for discoloring rubbers. Thus, suitable extender oils include pine tar, light lubricating oils, and the like. Circosol 2XH (a proprietary designation) is a light lubricating oil fully described in Rubber Age, vol. 70, No. 6, pages 735–747, March 1953, and is a proprietary product of Sun Oil Company, and is a particularly suitable extender oil. Circosol 2XH contains hydrocarbons of high molecular weight, in the form of a heavy, viscous, transparent, pale green, odorless liquid of low volatility; it has a specific gravity of 0.940, and a Saybolt Universal viscosity at 100° F. of about 2000 seconds. Other extender oils are disclosed and described in U.S. Pat. 2,964,083, reference to which is hereby made. The amount of extender oil employed will be from about 15 to 150 parts by weight for each 100 parts by weight of rubber component.

The usual fillers, reinforcing agents, antioxidants, vulcanizers, extenders, plasticizers, softeners, processing aids, as well as activators and accelerators well known in the preparation of natural rubber and synthetic rubber compositions, can be employed in preparation of the elastomeric compositions.

Fillers that can be employed include aluminum flake, antimony sulfide, asbestos, barium sulfate, cadmium sulfide, appropriate grades of carbon black, chromic oxide, clay, such as bentonite, cotton linters, iron oxide, lime, litharge, lithopone, magnesium carbonate, magnesium oxide, silica, slate flour, talc, titanium oxide, whiting, zinc oxide, zinc sulfide, and the like. Zinc oxide, reinforcing grades of carbon black, hydrated silica, calcium carbonate, and the like, can be employed as reinforcing agents. Suitable pigments, such as ultramarine, vermillion, or the like, can be employed to impart to the composition a desired color.

It is to be understood that the above description and examples are illustrative of this invention and not in limitation thereof.

What I claim and desire to protect by Letters Patent is:

1. A composition of matter consisting essentially of, by weight,
    (A) from about 5 parts to about 10 parts of a modified rosin selected from the group consisting of disproportionated rosin, hydrogenated rosin, and mixtures thereof,
    (B) from about 1 part to about 5 parts of an unsubstituted rosin amine, and
    (C) from about 1 part to about 10 parts of naphthenic oil.

2. A composition of matter consisting essentially of, by weight,
    (A) from about 5 parts to about 10 parts of a modified rosin selected from the group consisting of disproportionated rosin, hydrogenated rosin, and mixtures thereof,
    (B) from about 1 part to about 5 parts of an unsubstituted rosin amine, and
    (C) from about 1 part to about 10 parts of aromatic oil.

3. A composition of matter consisting essentially of, by weight,
    (A) from about 5 parts to about 10 parts of a modified rosin selected from the group consisting of disproportionated rosin, hydrogenated rosin, and mixtures thereof,
    (B) from about 1 part to about 5 parts of an unsubstituted rosin amine, and
    (C) from about 1 part to about 10 parts of highly aromatic oil.

4. The composition of claim 1 wherein rosin component (A) is disproportionated rosin.

5. The composition of claim 1 wherein rosin component (A) is hydrogenated rosin.

6. A composite member comprised of (1) a member comprised of an elastomeric polymer selected from the group consisting of (a) elastomeric copolymers of ethylene and at least one α-olefin having the structure $$R-CH=CH_2$$

wherein R is a $C_1-C_8$ alkyl radical, (b) unsaturated interpolymers of ethylene, at least one α-olefin having the structure $R-CH=CH_2$ wherein R is a $C_1-C_8$ alkyl radical, and at least one nonconjugated hydrocarbon diene, and (c) mixtures of (a) and (b), and (2) a tacky coating on the surface of said member, said coating being a composition of matter consisting essentially of, by weight, from about 5 parts to about 10 parts of a modified rosin selected from the group consisting of disproportionated rosin, hydrogenated rosin, and mixtures thereof, from about 1 part to about 5 parts of an unsubstituted rosin amine, and from about 1 part to about 10 parts of naphthenic oil.

7. A composite member comprised of (1) a member comprised of an elastomeric polymer selected from the group consisting of (a) elastomeric copolymers of ethylene and at least one α-olefin having the structure $$R-CH=CH_2$$

wherein R is a $C_1-C_8$ alkyl radical, (b) unsaturated interpolymers of ethylene, at least one α-olefin having the structure $R-CH=CH_2$ wherein R is a $C_1-C_8$ alkyl radical, and at least one nonconjugated hydrocarbon diene, and (c) mixtures of (a) and (b), and (2) a tacky coating on the surface of said member, said coating being a composition of matter consisting essentially of, by weight, from about 5 parts to about 10 parts of a modified rosin selected from the group consisting of disproportionated rosin, hydrogenated rosin, and mixtures thereof, from about 1 part to about 5 parts of an unsubstituted rosin amine, and from about 1 part to about 10 parts of aromatic oil.

8. A composite member comprised of (1) a member comprised of an elastomeric polymer selected from the group consisting of (a) elastomeric copolymers of ethylene and at least one α-olefin having the structure $$R-CH=CH_2$$

wherein R is a $C_1-C_8$ alkyl radical, (b) unsaturated interpolymers of ethylene, at least one α-olefin having the structure $R-CH=CH_2$ wherein R is a $C_1-C_8$ alkyl radical, and at least one nonconjugated hydrocarbon diene, and (c) mixtures of (a) and (b), and (2) a tacky coating on the surface of said member, said coating being a composition of matter consisting essentially of, by weight, from about 5 parts to about 10 parts of a modified rosin selected from the group consisting of disproportionated rosin, hydrogenated rosin, and mixtures thereof, from about 1 part to about 5 parts of an unsubstituted rosin amine, and from about 1 part to about 10 parts of highly aromatic oil.

9. A composite member in accordance with claim 6 wherein the rosin component of the composition of matter is disproportionated rosin.

10. A composite member in accordance with claim 6 wherein the rosin component of the composition of matter is hydrogenated rosin.

References Cited

UNITED STATES PATENTS

| 2,491,913 | 12/1949 | Amberg | 260—102 |
| 3,311,151 | 3/1967 | Willis et al. | 260—80.7 |
| 3,402,140 | 9/1968 | Bickel et al. | 260—24 |

OTHER REFERENCES

"Rubber Age," vol. 70, No. 6, 1952 (pp. 735 to 747 relied on).

Chatfield, H. W., "Varnish Constituents," 1953, TP 938 C53 (pp. 196 to 199 relied on).

DONALD E. CZAJA, Primary Examiner

W. E. PARKER, Assistant Examiner

U.S. Cl. X.R.

106—218; 117—168; 260—27, 33.6, 33.8, 100, 102